F. E. BEAM

MOLDING MACHINE FOR PLASTIC MATERIALS

Filed April 10, 1922  6 Sheets-Sheet 6

INVENTOR
Frank E. Beam,
By Owen Owen & Crampton
Attys.

Patented May 22, 1923.

1,456,174

UNITED STATES PATENT OFFICE.

FRANK E. BEAM, OF TOLEDO, OHIO, ASSIGNOR TO THE AUTOMAT MOLDING & FOLDING COMPANY, OF TOLEDO, OHIO, A CORPORATION OF OHIO.

MOLDING MACHINE FOR PLASTIC MATERIALS.

Application filed April 10, 1922. Serial No. 550,984.

*To all whom it may concern:*

Be it known that I, FRANK E. BEAM, a citizen of the United States, and a resident of Toledo, in the county of Lucas and State of Ohio, have invented a certain new and useful Molding Machine for Plastic Materials; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to machines for successively molding butter, lard and other material of workable or plastic nature into bricks or blocks of predetermined shape.

The primary object of the invention is the provision of a simple and efficient machine of the class described, which is automatically operable to firmly press the material operated on in column form of predetermined cross-sectional shape, successively impart predetermined advancing movements to the column and sever it into blocks or bricks of predetermined size.

A further object of the invention is the provision, in a machine of the class described, of novel, simple, efficient and automatic means for kneading and pressing the plastic material operated on to eliminate air and hollow spaces therefrom and to work it into solid column form.

Further objects and advantages of the invention will be apparent from the following detailed description thereof.

While the invention in its broader aspect is capable of embodiment in numerous forms, a preferred embodiment thereof is illustrated in the accompanying drawings, in which—

Referring to the drawings, 1 designates a frame or table which is provided on one side portion of its top with two transversely spaced sets of uprights 2 with the members of each set spaced longitudinally of the frame. Each set of uprights carries at its inner side a board or wall member 3 and these boards extend substantially the full length of the table or frame and are spaced apart transversely of the frame to provide a molding space or channel 4 therebetween having an open bottom and open at its forward end.

Cross shafts 5 and 6 are mounted in the upper portion of the frame 1 at the front and rear end portions thereof, respectively, the shaft 5 carrying a sprocket-wheel 7 and the shaft 6 carrying a guide-wheel 8, both in central longitudinal alinement with the molding space or channel 4. A sprocket-chain 9 connects and is guided by the wheels 7 and 8, being driven by the former, and has its upper horizontal flight disposed slightly below the lower open end of the channel 4 in parallel relation thereto. The links of the chain are of broad form and each carries at its outer side a block 10, which blocks are of sufficient length longitudinally of the chain to have close abutment against one another at their front and rear edges when traveling a straight course between the two guide-wheels. The blocks 10 when traversing the upper flight of the chain or apron ride at their edges on guide flanges 11 projecting inwardly from the lower portions of the respective sets of standard 2 and hold the blocks in sliding coaction at their respective side edges with the bottom edges of the boards or wall members 3 and cooperate to effectually close and form a movable bottom for the molding space or channel 4.

Figure 6:
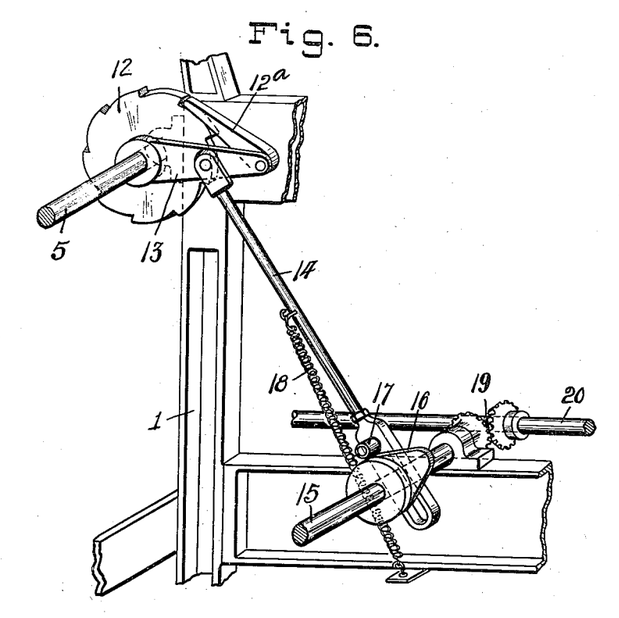
Fig. 6 is an enlarged fragmentary detail of a portion of the conveyor actuating mechanism.

The cross-shaft 5 is provided with a ratchet-wheel 12 with which a pawl $12^a$ carried by an arm 13 engages to impart successive step by step rotation to the shaft when the arm is rocked, as shown in Fig. 6. The arm 13 is mounted for free rocking movements on the shaft 5 and has an operating rod 14 projecting downward and rearward therefrom with its lower end straddling a cross-shaft 15, which is journaled in the lower portion of the frame 1. The shaft 15 carries a cam 16 in engagement with a roller 17 on the rod 14 whereby a pawl actuating movement is imparted to the rod at each revolution of the cam. The roller 17 is yieldingly held in engagement with the cam by a coiled contractile spring 18, which connects the rod 14 to a stationary part of the frame. The shaft 15 is in bevel gear connection 19 at one end with a line or drive shaft 20 disposed at a side of the frame lengthwise thereof. Each movement imparted to the shaft 5 by the ratchet mechanism is sufficient to advance the apron 9 the length of one link or block.

Figure 2:
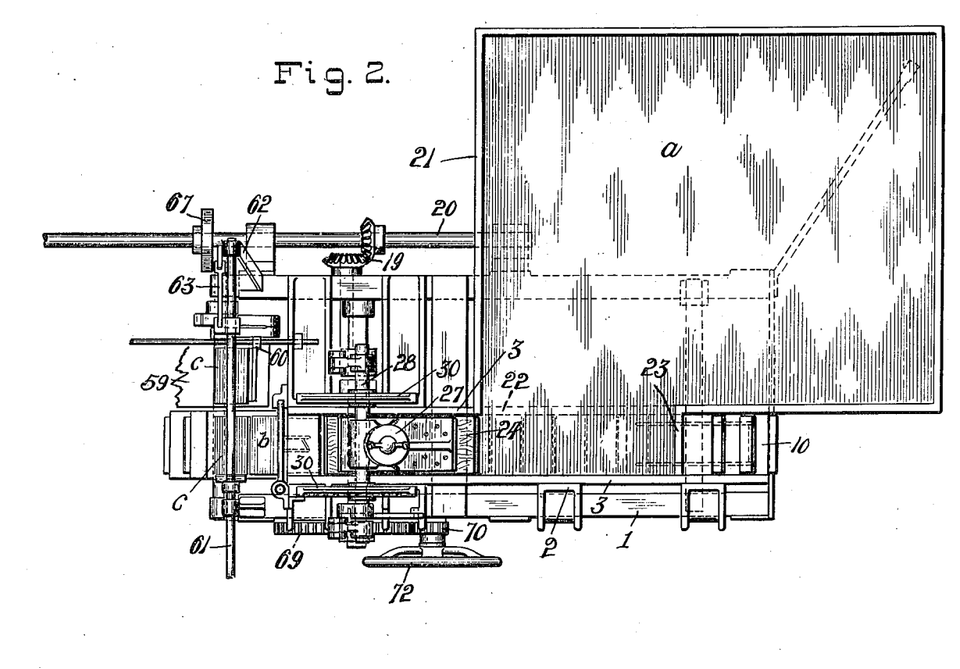
Fig. 2 is a top plan view thereof with parts broken away.

A hopper or receptacle 21 for the butter or plastic material $a$ to be operated on is mounted on top of the frame or table 1 at the rear end portion thereof and at a side of the channel 4 and has a side opening 22 therein (Figs. 2 and 5) in communication with the rear end portion of the channel 4 at the adjacent side thereof so that the material may feed from the hopper through the opening 22 into said channel. The rear end of the channel 4 is closed adjacent to the rear end of the discharge opening 22 of the hopper by a partition 23, which is preferably curved downward and forward from the top of the channel to a point adjacent to the top of the conveyor belt. It is evident that the advancing movements of the conveyor belt effect a forward feeding therewith of the material which has been forced down into the channel 4 in engagement with the belt.

Figure 5:
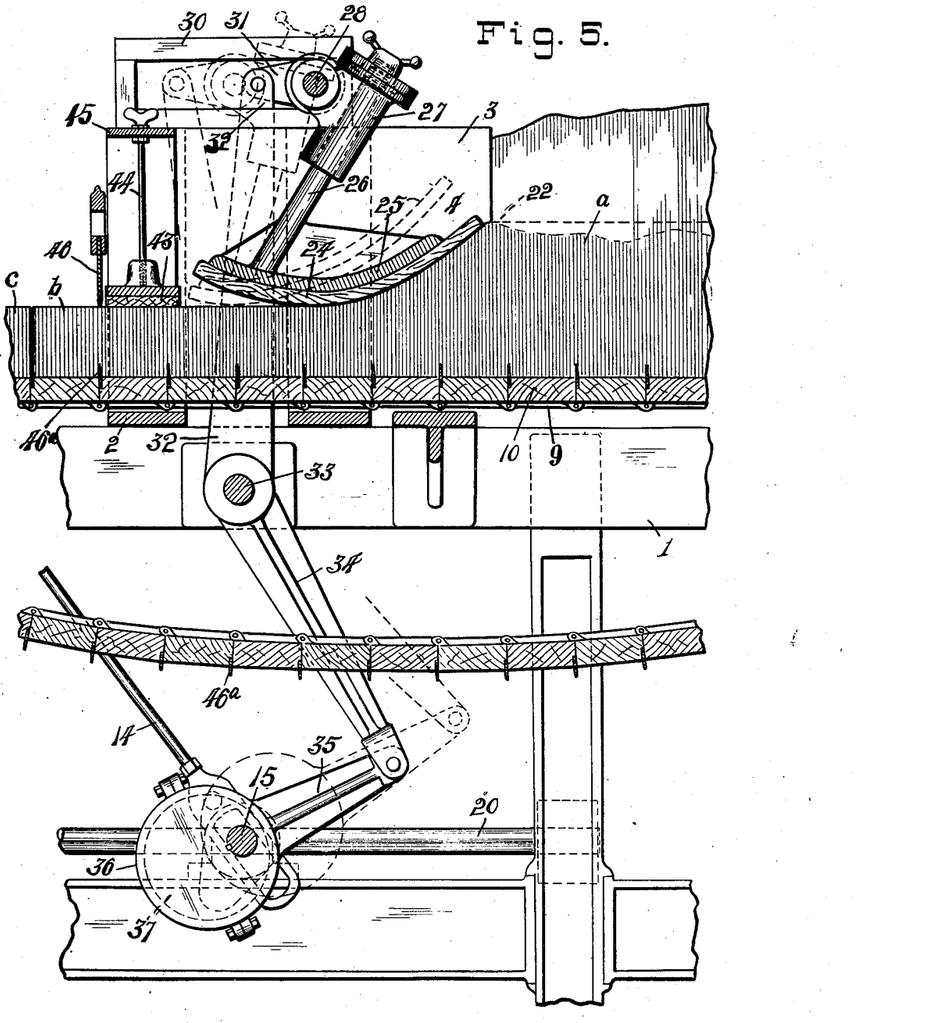
Fig. 5 is an enlarged fragmentary longitudinal section lengthwise through a portion of the conveyor and the material pressing and column forming means.

The material $a$ is pressed into column form, rectangular in cross-section, within the bottom portion of the channel 4 at its forward end or in advance of the hopper discharge opening 22 by the operation of a kneading or pressing blade 24, which has its material coacting surface curved in convex form longitudinally of the channel and is of a width substantially equal to that of the channel 4. The blade 24 is carried by a pressing head 25, which has a stem or arm 26 projecting upward and rearward therefrom adjacent to the forward end of the blade and fixedly carried at its upper end by a bracket head 27. This bracket head is carried by a shaft 28 at the forward side thereof so that the arm 26 is disposed in tangential relation to a circle concentric to the shaft axis, as shown in Fig. 5. The shaft 28 is mounted in horizontally disposed slots 29 provided in bearing brackets 30 rising from one or more of the forward standards 2 of each set, thereby enabling the shaft 28 to have transverse reciprocatory movements longitudinally of the channel and rocking movements about its axis in any position of transverse adjustment.

A link 31 is loosely mounted on each end of the shaft 28 without the respective bearing members 30, and each link projects forward from the shaft and is pivotally connected to the upper end of a respective rocker arm 32, which is fixed to and rises from a rocker-shaft 33. The shaft 33 has an arm 34 fixedly projecting downward and rearward therefrom and connected at its lower end to an eccentric arm 35, the strap 36 of which is mounted on an eccentric 37 fixed to the cross-shaft 15. It is thus evident that a rotation of the shaft 15 will impart rocking movements to the arms 32 and cause the shaft 28 to have forward and rearward reciprocating movements in its guide slots 29. Such movements of the shaft 28 will cause the blade 24 to have a rolling action on the material to effect a pressing of the same into the bottom portion of the channel 4 to form the column $b$ and cause a flattening of the top surface of such column. In order to make the rolling action of the blade 24 positive when the shaft 28 is being reciprocated, the shaft has an arm 40 (Fig. 1) rigidly projecting downward and forward therefrom and pivotally connected at its lower end to a link 41, which extends rearward therefrom and is pivoted at its rear end to one of the standards 2, as at 42. As the shaft 28 is moved rearward the movement of the upper end of the arm 40 therewith, while the lower end of the arm is practically held stationary against rearward movement, causes a slight rocking or rolling movement to be positively communicated to the blade 24 so that the blade will be rolled rearward from the dotted line position to the full line position shown in Fig. 5 and then returned.

This movement of the kneading or pressing blade 24 is found to be very efficient in pressing the material down into the molding channel and forming it into column form. The stem 26 of the presser blade may be longitudinally adjusted in its carrying bracket 26 to suit the depth of the column $b$ which it is desired to form.

The column $b$ immediately in advance of the presser blade 24 passes under a top pad 43, which has smoothing coaction with the top surface of the column as it is advanced. This pad is disposed between the forward end portions of the side walls 3 of the channel and is carried for vertical adjustment by a stem 44, which projects up through a cross-piece 45 disposed between the upper edge portion of the walls 3.

After each forward feeding operation of the column $b$, a brick $c$ is severed from its forward end by the lowering of a knife 46, which cooperates in the severing action with a blade 46ª secured to an edge of each apron block 10, and which blades are successively moved into vertical register with the knife 46 by advancing movements of the apron.

Figure 1:
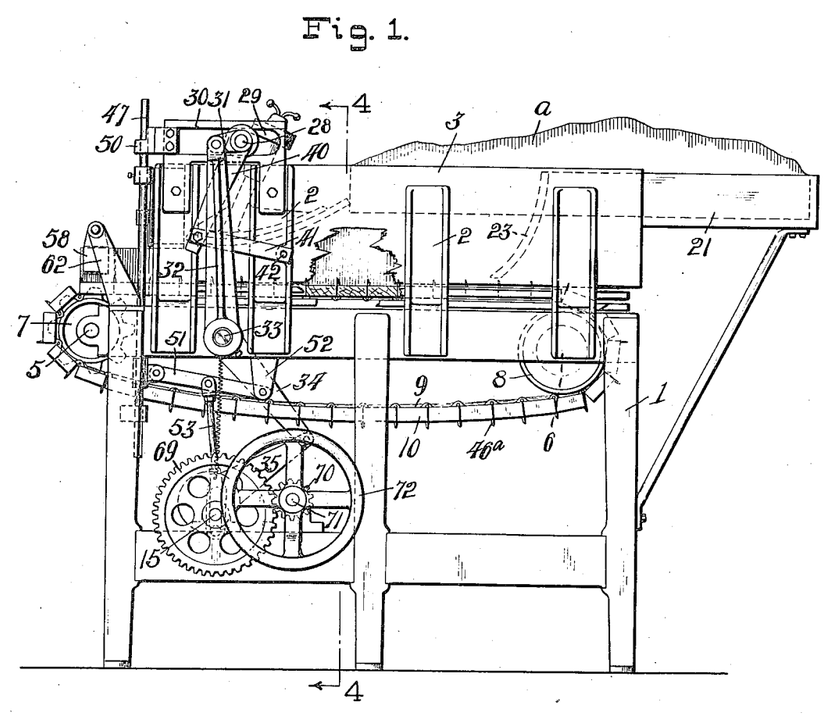
Figure 1 is a side elevation of an apparatus embodying the invention with a part broken away.
Figure 7:
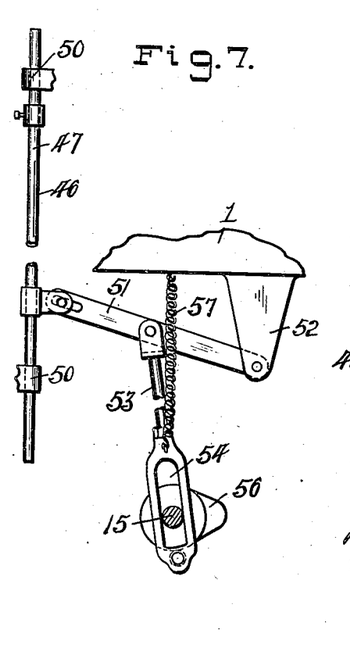
Fig. 7 is an enlarged fragmentary side of the knife operating means.
Figure 8:
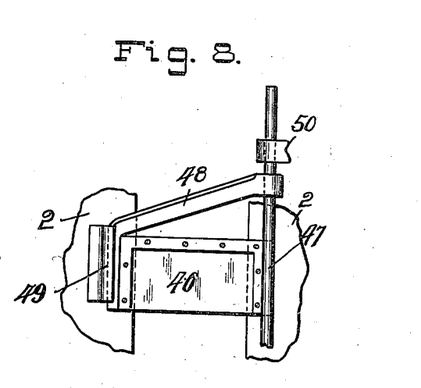
Fig. 8 is a fragmentary front elevation of the column severing means.

The knife 46 is fixed at one end to a vertical rod 47 and has its free end braced with respect to the rod by an arm 48 (Fig. 8) and guided for reciprocatory movements by a guide flange 49 fixed to a forward standard 2. The rod 47 is guided for longitudinal reciprocatory movements by guide members 50 through which it projects, one of said members 1 projecting from the forward end of one of the bearing parts 30 while the other is fixed to an adjacent part of the frame 1 (Fig. 1). The rod 47 has pin and slot connection with one end of a link 51, which extends rearward therefrom below the top of the frame or table 1 and is pivoted at its rear end to a bracket arm 52 extending down from the top portion of the frame. A rod 53 is pivotally connected at its upper end intermediate its ends and has its lower end portion provided with a longitudinally extending slot 54, which straddles the shaft 15 to enable it to have reciprocatory movements transversely thereof. The rod 53 is provided at the lower side of the shaft 15 with a side pin 55, which is engaged by a cam 56 on the shaft 15 to impart a positive lowering movement to the rod and a consequent column severing movement to the blade 46 at each revolution of the shaft. The pin 55 is normally held up against the cam by a coiled contractile spring 57, which extends upward from the rod 53 and is anchored at its upper end to a superposed portion of the frame 1, as best shown in Fig. 7. The column severing movement imparted to the knife 46 is sufficient to lower it into coaction with the subjacent apron blade 46ª. The movements of the knife 46 are so timed with respect to the movements of the column b that it will have been lowered to sever a brick from the column and then raised to normal position after each advancing movement of the column and before the next movement thereof.

Figure 3:
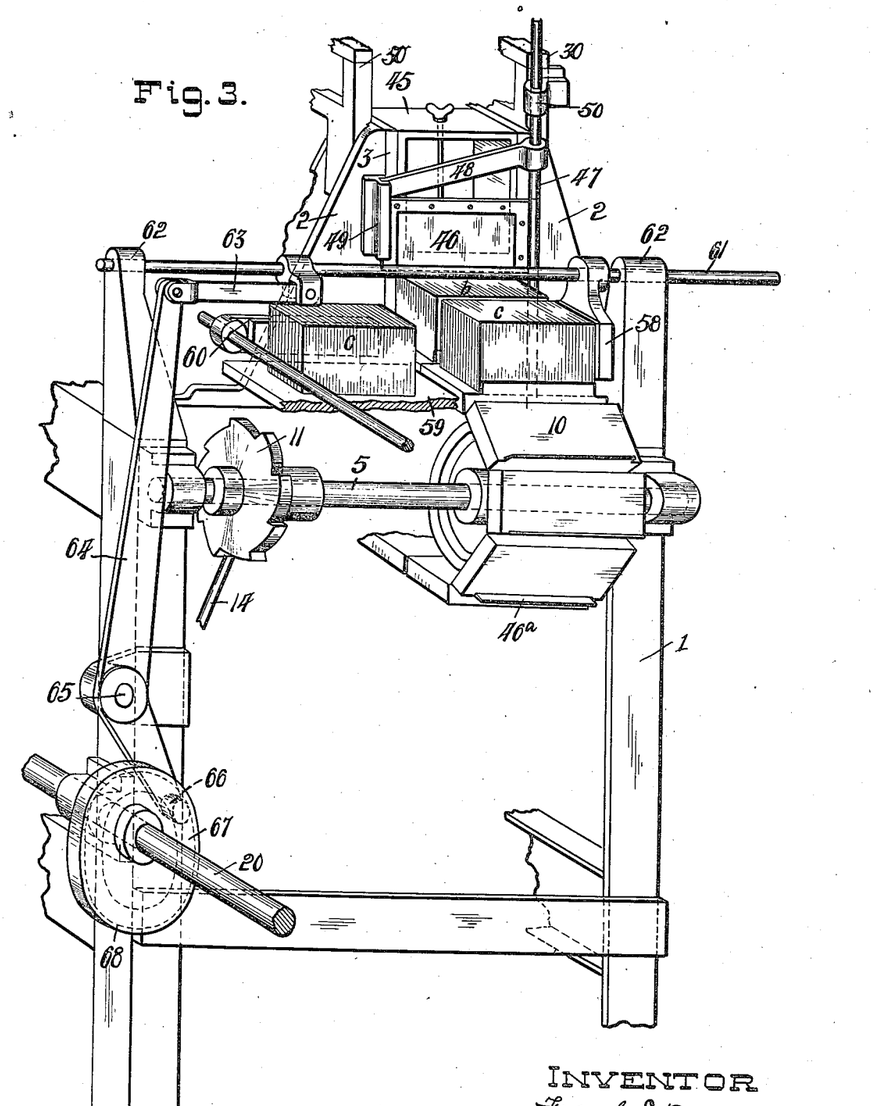
Fig. 3 is an enlarged fragmentary front perspective elevation of the machine.
Figure 4:
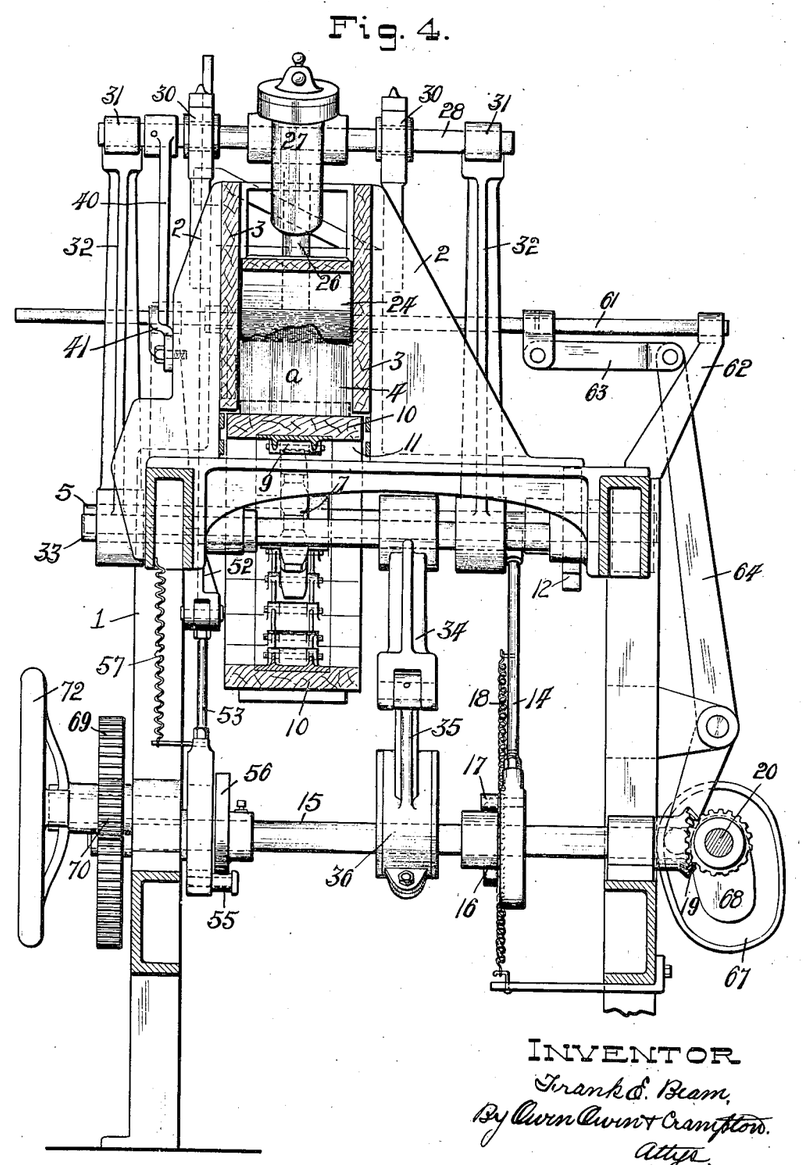
Fig. 4 is an enlarged vertical cross-section taken on the line 4—4 in Fig. 1.

When a brick c has been severed from the column and advanced a predetermined distance from severing position, in the present instance one step of movement of the conveyor apron, the brick is engaged at a side thereof by an arm 58 and moved thereby transversely from the supporting block 10 of the conveyor apron and onto a table or support 59 at a side of the apron, as best shown in Fig. 3. This leaves the brick in position to be moved forward into a machine by means of which it is wrapped with a tissue sheet and then placed in a carton. The block c is moved forward from the table 59 by an arm 60 or in any other suitable manner. As the tissue wrapping and carton folding machine has nothing to do with the present invention, it is not necessary to describe the same. The arm 58 is carried by a rod 61, which is mounted for reciprocatory movements transversely of the frame 1 in standards 3 rising therefrom. A link 63 which is disposed longitudinally of the rod 61 is pivotally connected to the rod and at its other end to the upper end of a lever 64, which is fulcrumed to the frame 1 at 65 and has its lower arm provided with a roller 66, which travels in a cam groove 67 on the face of a cam wheel 68 mounted on the shaft 20. It is thus evident that a rotation of the cam 68 will impart a forward and backward reciprocatory movement to the rod 61.

To facilitate a hand operating of the machine, the shaft 15 is provided at one end with a large gear 69 which meshes with a small gear 70 on a stub shaft 71 journaled in the frame 1 and on which is mounted a hand wheel 72.

In an operation of the machine, the drive shaft 20 is customarily driven to impart continuous rotation to the cross-shaft 15 and which at each revolution thereof imparts, (1) a feeding movement to the conveyor belt 9, 10 to advance it the length of one block thereof, such feeding movement being effected by action of the cam 16 on the rod 14 to impart a forward feeding stroke to the ratchet pawl 12ª, the ratchet 12 of which is on the shaft 5 with the feed sprocket of the conveyor apron; (2) a movement of the knife 46 to sever a block c from the forward end of the column b after each forward feeding operation of the column, such knife movement being actuated by the action of the cam 56 on the rod 53; and (3) a movement of the rocker arms 32 to impart a rolling material pressing movement to the kneading or pressing blade 24, such movement being effected by the action of the eccentric 37. The operator feeds the material a from the hopper 21 into the rear end of the molding channel 4 as the forming column is advanced by the forward feeding of the conveyor 9, 10, and the material which is advanced under the pressing blade 24 at each advancing movement is gradually pressed down into desired column form within the column 4 by the successive rearward and forward rolling movements of the blade 24, which are accomplished by the combined reciprocatory movements of the shaft 28 in its bearings 29 and the rocking of the arms 40, which are fixed to the shaft during such movements. The rearward rolling coaction of the presser blade 24 with the material a causes the material to be compactly pressed into column form of predetermined cross-section and the surplus material to be worked to the rear from forming position. As the formed column advances from forming position it passes under the pad 43, which has wiping or smoothing coaction with the top surface thereof. The advanced end of the column is then severed at the outer side of the pad 43 by a downward stroke of the blade 46, which receives its actuating movement from the cam 56, and is returned to normal raised position after the severing stroke by the action of the spring 57. When the severed brick has been advanced another step it is engaged by the arm 58 and moved sidewise from the conveyor belt onto the table 59, the movement of the arm being communicated thereto from the cam 68.

It is evident that I have provided a simple and efficient machine for acting on material of a plastic nature to form the same into solid or hard pressed column form and then to advance the forming column and successively sever the same into bricks or sections as the advancing progresses and then remove the severed bricks from the advancing means.

I wish it understood that my invention is not limited to any specific construction, arrangement or form of the parts as it is capable of embodiment in numerous forms without departing from the spirit of the claims.

Having thus described my invention, what I claim as new and desire to secure by Letters Patent, is,—

1. In a machine of the class described, means forming a channel for receiving the material to be pressed into shape corresponding to the cross-sectional shape of a portion of the channel, a curved presser plate mounted in the channel over the material for rolling movements lengthwise of the channel, and mechanism operable to impart predetermined reciprocatory movements to the blade.

2. In a machine of the class described, means forming a material molding channel, a curved presser member mounted for rolling movements on material within the channel to press it into predetermined shape, means for imparting predetermined transverse movements to the rolling axis of the member, and means for imparting a positive rolling movement to the member when its axis is shifted.

3. In a machine of the class described, means forming a molding channel, a curved member mounted to have rolling coaction with material in the channel to press it into predetermined shape, rocker means operable to impart predetermined transverse reciprocatory movements to a stationary part to cause the member to have predetermined rolling movements positively thereto when its axis is shifted.

4. In a machine for molding plastic material, means forming a molding channel, a conveyor means movable in the bottom of the channel longitudinally thereof, means imparting intermittent advancing movements to the conveyor means, a member mounted in the channel for rolling pressing coaction with material therein longitudinally of the channel, and mechanism periodically operable to impart a predetermined reciprocatory rolling movement to the member.

5. In a machine for molding plastic material in column form, means forming a molding channel, conveyor means movable longitudinally through the channel and forming the bottom thereof, a curved presser member mounted in the channel for rolling movements longitudinally thereof to press material into column form in the channel, means periodically operable to impart step by step advancing movements to the conveyor and column of material formed thereon, and mechanism having a rolling material pressing member disposed in the channel for pressing coaction with the top of material therein, said mechanism being periodically operable to impart reciprocatory rolling movements to the pressing member thereof longitudinally of the channel.

6. In a machine for molding plastic material, an endless conveyor apron, means cooperating with a flight of the apron to form a material molding channel of which the apron is the bottom, means periodically operable to impart step by step advancing movements to the apron, a presser member having a curved surface in rolling pressing coaction with the top material in the channel, and mechanism operable to periodically impart reciprocatory rolling movements to the member lengthwise of the channel.

7. In a machine for molding plastic material in column form, an endless conveyor apron, means cooperating with a flight of the apron to form a material molding channel with the apron as its bottom, a curved presser member mounted in the channel for rolling movements lengthwise thereof on material therein to press it into column form within the channel, means operable to periodically reciprocate the rolling axis of the member lengthwise of the channel, means causing a positive rolling movement to be imparted to the member when its axis is shifted, and means periodically operable to move the apron to impart successive advancing movements to the apron and material thereon.

8. In a machine for molding plastic material in column form, a material pressing member of curved form, a shaft carrying said member and mounted for transverse reciprocatory movements, means operable to impart transverse reciprocatory movements to the shaft, and means for imparting positive molding movements to the member when the shaft is reciprocated.

9. In a machine for molding plastic material in column form, a curved material pressing member, a shaft disposed above the member and mounted for rocking and transverse reciprocatory movements, a carrying arm projecting upward from the member at a side of the shaft in tangential relation to a curve concentric to its axis and fixed to the shaft, means operable to periodically impart horizontal transverse reciprocatory movements to the shaft, and means connected to the shaft and operable to positively rock the same and to impart a rolling movement to the member when the shaft is transversely moved.

10. In a machine of the class described, means forming a molding channel, an endless conveyor means movable in the bottom of the channel longitudinally thereof, means for periodically advancing the conveyor means, means operable to press plastic material in column form in the channel on the top of the conveyor means, and means periodically operable to sever the formed column into sections.

11. In a machine of the class described, means forming a molding channel, an endless conveyor movable lengthwise in the channel and having its upper flight forming the bottom thereof, means operable to rollingly press plastic material in column form in the channel on the top of the conveyor means, means intermittently operable to impart step by step advancing movements to the conveyor means, and means operable after each advancing movement to sever a predetermined section from the forward end of the column.

12. In a machine of the class described, a continuously rotating shaft, means forming a molding channel, an endless conveyor means movable lengthwise of the channel and having the upper flight thereof forming the channel bottom, means connecting said shaft and conveyor means and operable to impart a predetermined advancing movement to the conveyor means at each rotation of the shaft, a member mounted in the channel for rolling pressing coaction with material therein, and means operable at each rotation of the shaft to impart a rolling material pressing movement to the member.

13. In a machine of the class described, a continuously rotating shaft, means forming a molding channel, an endless conveyor means movable lengthwise of the channel and having the upper flight thereof forming the channel bottom, means connecting said shaft and conveyor means and operable to impart a predetermined advancing movement to the conveyor means at each rotation of the shaft, a member mounted in the channel for rolling pressing coaction with material therein, means operable at each rotation of the shaft to impart a rolling material pressing movement to the member, and means operable by the shaft at each rotation thereof to sever a section from the forward end of the formed material column.

14. In a machine of the class described, a continuously rotating shaft, means forming a molding channel, an endless conveyor means movable lengthwise of the channel and having the upper flight thereof forming the channel bottom, means connecting said shaft and conveyor means and operable to impart a predetermined advancing movement to the conveyor means at each rotation of the shaft, a member mounted in the channel for rolling pressing coaction with material therein, means operable at each rotation of the shaft to impart a rolling material pressing movement to the member, means operable by the shaft at each rotation thereof to sever a section from the forward end of the formed material column, and means operable to move a severed section transversely from the conveying means after each severing action.

In testimony whereof, I have hereunto signed my name to this specification.

FRANK E. BEAM.